March 20, 1945.  A. L. C. DELLOYE  2,371,880
VITREOUS INSULATORS
Filed Nov. 16, 1940
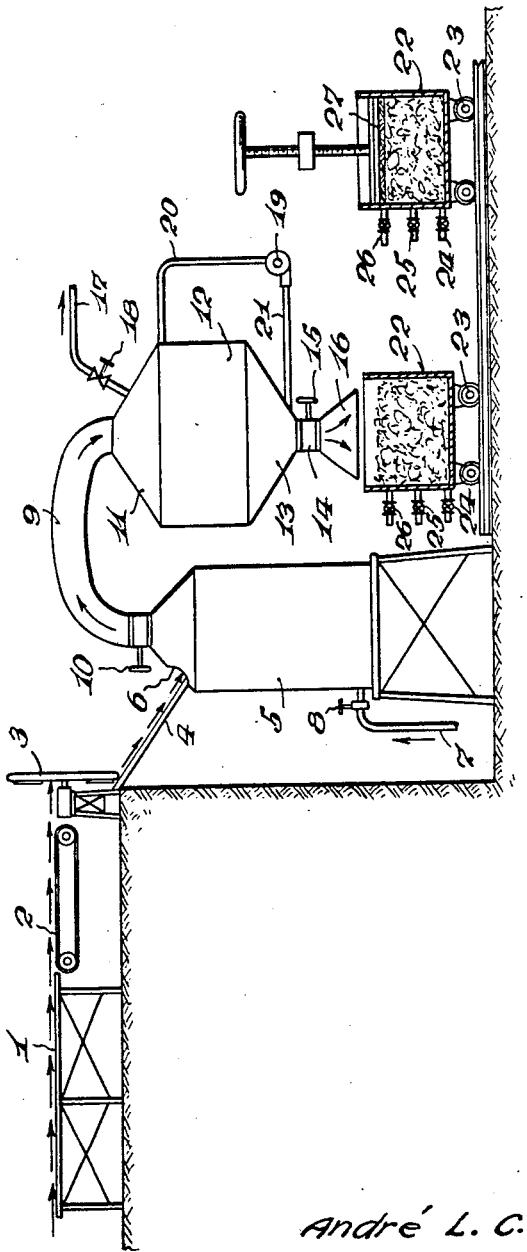
Inventor
André L. C. Delloye,
By [signature]
Attorney Patented Mar. 20, 1945

2,371,880

UNITED STATES PATENT OFFICE 2,371,880

VITREOUS INSULATOR

André Laurent Camille Delloye, Paris, France; vested in the Alien Property Custodian Application November 16, 1940, Serial No. 365,862
In France October 2, 1939

5 Claims. (Cl. 154—44)

For the purpose of manufacturing units for insulating heat and sound by the aid of threads of glass or other vitreous substances the hanks formed by these threads are spread out in superposed layers, which are then heaped up until each unit is of sufficient thickness for providing the required degree of insulation. Since this manufacture is carried out by hand it is not possible to obtain a homogeneous product, for the degree of insulation, which is a function of the proportion between the quantity of glass threads and the quantity of air interposed between these threads per unit of volume, varies from point to point. Since the insulating power in such a unit does not exceed that of the zone at which the degree of insulation is weakest, it follows that the quantity of glass threads employed in the unit as a whole is much greater than the quantity really necessary for obtaining the same insulating power. To this disadvantage are to be added that of the cost of labour and that of the risks inherent in the manipulation of glass threads, which, when they break, are liable to pierce the skin, the eyes, and the respiratory organs.

The object of the present invention is to provide a method of manufacture which obviates these disadvantages. This method consists in cutting the hanks of glass threads in such a manner that the cut threads are of a substantially uniform and reduced length, then disentangling these cut threads in a current of fluid, and leaving the threads, thus disentangled, to settle out, thus forming a mattress or cushion, which is then dried and compressed in such a manner as to give it a thickness suitable for obtaining the degree of insulation required.

The invention further consists in the resulting new industrial product, the insulator for heat or sound or both, which consists of threads of glass or other vitreous substance, cut to a short and substantially constant length and agglomerated to form a uniform mixture, that is to say, a mixture in which the ratio between the quantity of glass threads and the quantity of air interposed between these threads is practically constant. The length of the cut threads, which may be reduced to less than one centimetre, depends upon the dimensions and the form of the insulating unit to be produced.

The invention likewise comprises the insulating units incorporating this novel product, and the plant enabling the said process to be carried out.

Plant for carrying out the process according to the invention is diagrammatically illustrated by way of example in elevation, partly in section, in the accompanying drawing.

This plant comprises a table 1, upon which are spread out the hanks of threads of glass or other vitreous material, in which the threads are arranged approximately parallel to one another, an endless belt 2 for conveying the hanks to a cutter 3, which cuts the threads into portions of the same length, and an inclined plane 4, down which these portions slide, to fall into a chamber 5 by passing through a charging door 6.

Compressed air is delivered tangentially to the lower part of the chamber 5 through a pipe 7 provided with a cock 8.

An evacuation pipe 9, which can be shut off by means of a valve 10, unites the conical upper portion of the chamber 5 with the likewise conical upper portion 11 of a reservoir 12, the bottom 13 of which is equipped with a tubular connection 14, having a valve 15, and a flared outlet 16.

The reservoir 12 may be filled with water or with some other liquid by means of a tube 17, provided with a cock 18. A pump 19 is connected to the upper part and to the lower part of the reservoir 12 by two tubes 20 and 21 respectively, so as to produce therein an upward circulation of water.

Below the flared aperture 16 are placed moulds 22 of a suitable form, which are movable upon wheels 23, and are provided with cocks 24, 25 and 26 at different levels for the discharge of water. A press 27 is provided for compressing the threads of glass which have been deposited in the moulds 22.

The apparatus hereinbefore described operates in the following manner: The speed of movement of the belt conveyor 2 and the cutting speed of the cutting machine 3 are so related to one another that the glass threads are cut to a uniform length, fixed in advance. The cutting is stopped when the lengths of thread have been accumulated in sufficient quantities in the chamber 5. The door 6 is then closed, and the air inlet cock 8 is opened, the valve 10 being closed. There is thus produced in the chamber 5 a whirling eddy of air, which disentangles the threads. The valve 10 is then opened, the reservoir 12 having been previously filled with water by opening the cock 18 and closing the valve 15. When all the threads, suitably disentangled, have been passed from the chamber 5 through the tube 9 into the reservoir 12, the valve 10 is closed, and the pump 19 is started so as to produce an ascending current of liquid in the mixture filling the reservoir 12. The operations of transporting the hanks, cutting up the threads and feeding the chamber 5 may then be resumed. After completing the stirring of the threads in the liquid in the reservoir 12, the mould 22 is placed underneath the aperture 16 of the reservoir, the pump 19 is stopped and the valve 15 opened. The glass threads then fall, with the water in which they were suspended, from the reservoir 12 into the mould 22, and this water flows away through the cocks 24, 25 and 26, which are opened in succession from the lowest to the highest, so as to obtain a regular settling of the threads in the mould. The latter is then moved into a position underneath the press 27, which compresses the threads deposited in the mould, until the totality of these threads has a predetermined thickness. The product is then dried.

To the liquid in the reservoir 12 there may be added a material such as soduim silicate, which is capable of subsequently forming a binding agent between the threads.

The discontinuous operations described above may be so modified as to render them continuous.

The treatment with water may moreover be omitted, provided the chamber 5 and the reservoir 12 are made of such forms and dimensions that the threads disentangled in the chamber 5 may be held in suspension in the reservoir 12, and may fall slowly into moulds or on to the conveyors.

Finally, an analogous device may be provided for the treatment of threads of other materials, such as asbestos for example, the threads of glass and the threads of the other materials being projected simultaneously in predetermined proportions into the interior of a reservoir in which they are mixed together, and from which they are discharged for deposition in moulds or upon conveyors.

The product formed by the threads, cut, deposited and suitably aggregated, is then enclosed in the usual manner in covers made of linen, paper, cardboard or other materials, in such a manner as to form insulating units of suitable shapes and dimensions.

The product of the invention, as compared with known insulating products made of glass threads, presents the advantage of great homogeneity, that is to say, of constant proportions per unit of volume between the glass threads and the air or other gas interposed between these fibres. Thanks to this homogeneity, and to the uniform insulating power resulting therefrom, it will be possible, as stated above, to employ insulating units of less thickness, and to attain in this way an appreciable economy of material, while obtaining in all respects the same predetermined insulating power.

The specific gravity of these elements varies according to the initial compression to which the product according to the invention has been subjected.

Having now described my invention, what I claim as new and desire to secure by Letters Patent is:

1. An insulating material for heat or sound or both, consisting of threads of glass, of a short and substantially uniform length and forming a mixture in which the ratio between the quantity of threads of glass and the quantity of air per unit of volume interposed between these threads is practically constant.

2. An insulating material as claimed in claim 1, in which the cut lengths of threads are covered with a binding agent.

3. An insulating material as claimed in claim 1, in which the cut lengths of threads are covered with sodium silicate.

4. An insulating material for heat or sound or both comprising threads of glass and threads of asbestos of a short and substantially uniform length and forming a mixture in which the ratio between the quantity of threads and the quantity of air interposed between these threads is practically constant.

5. An insualtor for heat or sound or both comprising threads of glass, of a short and substantially uniform length and forming a mixture in which the ratio between the quantity of threads of glass and the quantity of air interposed between these threads is practically constant, and an envelope containing said agglomerated threads.

ANDRÉ LAURENT CAMILLE DELLOYE.